United States Patent [19]

Richardson, Jr. et al.

[11] Patent Number: 5,692,034
[45] Date of Patent: *Nov. 25, 1997

[54] CUSTOMIZED, BILLING-CONTROLLED CALL BRIDGING SYSTEM

[75] Inventors: Charles Thomson Richardson, Jr., Norcross; Kevin Lee Austin, Roswell; Samuel F. Billingsley, III, Atlanta, all of Ga.

[73] Assignee: United States Advanced Network, Inc., Norcross, Ga.

[*] Notice: The term of this patent shall not extend beyond the expiration date of Pat. No. 5,355,403.

[21] Appl. No.: 444,571

[22] Filed: May 19, 1995

Related U.S. Application Data

[63] Continuation of Ser. No. 254,166, Jun. 6, 1994, Pat. No. 5,581,607, which is a continuation of Ser. No. 861,630, Apr. 1, 1992, Pat. No. 5,355,403, which is a continuation-in-part of Ser. No. 852,491, Mar. 16, 1992, Pat. No. 5,317,627, which is a continuation of Ser. No. 591,047, Oct. 1, 1990, Pat. No. 5,113,430.

[51] Int. Cl.$^6$ ............................... H04M 1/64; H04M 3/42
[52] U.S. Cl. ..................... 379/88; 379/34; 379/112; 379/202; 379/203; 379/208
[58] Field of Search ............................ 379/67, 88, 89, 379/34, 112, 202, 203, 204

[56] References Cited

U.S. PATENT DOCUMENTS

| | | | |
|---|---|---|---|
| 3,728,486 | 4/1973 | Kraus | 179/2 R |
| 4,071,698 | 1/1978 | Barger et al. | 179/2 R |
| 4,188,507 | 2/1980 | Meri et al. | 179/60 |
| 4,229,624 | 10/1980 | Haben et al. | 179/18 |
| 4,255,619 | 3/1981 | Saito | 379/96 |
| 4,317,007 | 2/1982 | Harrison | 379/34 |
| 4,320,256 | 3/1982 | Freeman | 179/6.04 |
| 4,371,752 | 2/1983 | Matthews et al. | 179/7.1 |
| 4,489,438 | 12/1984 | Hughes | 381/51 |
| 4,577,062 | 3/1986 | Hilleary et al. | 179/2 |
| 4,598,367 | 7/1986 | DeFrancesco et al. | 364/408 |
| 4,611,094 | 9/1986 | Asmuth et al. | 179/7.1 |
| 4,640,991 | 2/1987 | Matthews et al. | 379/88 |
| 4,649,563 | 3/1987 | Riskin | 379/97 |
| 4,663,777 | 5/1987 | Szeto | 379/88 |
| 4,716,583 | 12/1987 | Groner et al. | 379/88 |
| 4,757,267 | 7/1988 | Riskin | 379/201 |
| 4,766,604 | 8/1988 | Axberg | 379/67 |
| 4,788,718 | 11/1988 | McNabb et al. | 379/113 |
| 4,792,968 | 12/1988 | Katz | 379/92 |
| 4,797,910 | 1/1989 | Daudelin | 379/244 |
| 4,797,911 | 1/1989 | Szlam et al. | 379/216 |
| 4,811,382 | 3/1989 | Sleevi | 379/67 |
| 4,817,130 | 3/1989 | Frimmel, Jr. | 379/88 |
| 4,827,500 | 5/1989 | Binkard et al. | 379/88 |
| 4,829,514 | 5/1989 | Frimmel, Jr. et al. | 370/58 |
| 4,845,739 | 7/1989 | Katz | 379/92 |
| 4,899,375 | 2/1990 | Bauer et al. | 379/264 |

(List continued on next page.)

FOREIGN PATENT DOCUMENTS

WO9118466  11/1991  WIPO ........................... H04M 3/50

OTHER PUBLICATIONS

"Three-Way Call Detect . . . Close Enough to Perfect" by Susan Anderson–Correctional Comm. Quarterly–Oct. 1993.
VAC Brochure.

(List continued on next page.)

*Primary Examiner*—Fan Tsang
*Attorney, Agent, or Firm*—Isaf, Vaughan & Kerr; Louis T. Isaf

[57] ABSTRACT

Method and apparatus for providing customized, billing-controlled call bridging services through a bridging node which includes a node interface for connection through incoming and outgoing telephone trunks to a carrier switch of a public switched network, an audio peripheral for recording, playing, and analyzing audio signals, and a node controller for controlling operation of the node interface and the audio peripheral.

28 Claims, 7 Drawing Sheets

U.S. PATENT DOCUMENTS

| | | | |
|---|---|---|---|
| 4,901,341 | 2/1990 | Carter et al. | 379/67 |
| 4,908,850 | 3/1990 | Masson et al. | 379/88 |
| 4,922,519 | 5/1990 | Daudelin | 379/67 |
| 4,922,520 | 5/1990 | Bernard et al. | 379/88 |
| 4,930,150 | 5/1990 | Katz | 379/93 |
| 4,933,966 | 6/1990 | Hird et al. | 379/132 |
| 4,933,967 | 6/1990 | Lo et al. | 379/207 |
| 4,935,956 | 6/1990 | Hellwarth et al. | 379/112 |
| 4,947,422 | 8/1990 | Smith et al. | 379/200 |
| 4,954,958 | 9/1990 | Savage et al. | 379/207 |
| 4,972,461 | 11/1990 | Brown et al. | 379/67 |
| 5,003,534 | 3/1991 | Gerhardt et al. | 379/94.1 |
| 5,014,303 | 5/1991 | Velius | 379/201 |
| 5,023,868 | 6/1991 | Davidson et al. | 370/62 |
| 5,048,075 | 9/1991 | Katz | 379/92 |
| 5,113,430 | 5/1992 | Richardson, Jr. et al. | 379/88 |
| 5,163,083 | 11/1992 | Dowden et al. | 379/223 |
| 5,185,781 | 2/1993 | Dowden et al. | 379/214 |
| 5,199,062 | 3/1993 | Von Meister et al. | 379/67 |
| 5,255,309 | 10/1993 | Katz | 379/88 |
| 5,317,627 | 5/1994 | Richardson, Jr. et al. | 379/88 |
| 5,335,266 | 8/1994 | Richardson, Jr. et al. | 379/88 |
| 5,355,403 | 10/1994 | Richardson et al. | 379/88 |
| 5,392,357 | 2/1995 | Bulfer et al. | 380/33 |

OTHER PUBLICATIONS

David S. Cheeseman, Martin B. Cooper–Radio & Electronic Engineer–vol. 53 (1983)–Voice Signaling in the Telephone Network pp. 241–247.

Tele–Matic Brochure.

Second IEEE National Conference on Telecommunications–P.P. Cretch A.R. Allwood,E.S.P. Allard, A Network for Recorded Info. Distribution–Apr. 1989 pp. 10–14.

David R. Fishell, Sarbmeet S. Kanwal, Daniel Furman–Interactive Voice Technology Applications–AT&T Tech. Journal–Sep. 10, 1990–pp.61–76.

Customer Control of Network Services, G.A. Boack, E.G.Sable RJ Stewart Oct. 1984–vol. 22 No. 10 IEEE Comm. Mag. pp. 8–14.

AT&T Comversont I Voice System–John P. Moosemiller, Mar./Apr. 1986 Speech Tech. pp. 88–93.

Convesant I Voice System Architecture and Appls.–Robert J. Perdue & Eugene L. Rissanen–AT&T Tech. Journal–pp. 34–47.

"System 20" Value Added Communications Brochure–Publication date unknown.

"Conquest III Inmate Telephone System" Tele–Matic Corporation Brochure–Publ. date unknown.

CUSTOMIZED, BILLING-CONTROLLED CALL BRIDGING SYSTEM

This application is a continuation of application Ser. No. 08/254,166, filed on Jun. 6, 1994, now U.S. Pat. No. 5,581,607, which is a continuation of Ser. No. 07/861,630, filed on Apr. 1, 1992, now U.S. Pat. No. 5,355,403, which is a continuation-in-part of Ser. No. 07/852,491, filed on Mar. 16, 1992, now U.S. Pat. No. 5,317,627, which is a continuation of Ser. No. 07/591,047, filed on Oct. 1, 1990, now U.S. Pat. No. 5,113,430.

BACKGROUND OF THE INVENTION

The present invention relates generally to the field of audio response automation, and more specifically, to the field of providing customized, billing-controlled call bridging services.

It is considered well known that significant economic advantages can often be realized by replacing manual systems with automated systems since the cost of human labor is very high. In the telecommunications world, human operators have long been vital links in completing certain types of calls, including collect calls, third-party calls, and person-to-person calls. However, the high costs of human labor associated with providing human operator assistance is very undesirable for most telephone service carriers.

Also, it is often desirable to control call billing options in certain types of telephone customer environments. In the penal environment, for example, the propensity for billing fraud, such as billing a call to an unauthorized number or credit account, is very high. In order to reduce the likelihood of billing fraud, it is frequently advantageous to permit inmates to make only collect calls. Many prior telephone systems handle all penal calls identically and tend to provide too much human operator involvement or billing functionality for penal environments, thus failing to take full advantage of the special needs and characteristics of penal environments.

Since prisoners often have abundant amounts of free time on their hands, inmate telephone privileges frequently provide inmates with opportunities for making nuisance calls to other parties, as well as to the live operators. Also, prison officials routinely need to record telephone conversations of selected prisoners. Few, if any, prior telephones systems provide features for effectively preventing nuisance calls and recording selected prisoner conversations.

There is, therefore, a need in the industry for a customized, billing-controlled call bridging system which addresses these and other related, and unrelated, problems.

SUMMARY OF THE INVENTION

Briefly described, the present invention includes, in its most preferred embodiment, a method and an apparatus for providing customized, billing-controlled call bridging services. The apparatus of the preferred embodiment of the present invention is connected through incoming and outgoing telephone trunks to a carrier switch of a public switched network and includes at least one bridging node which includes a node interface for interfacing to the carrier switch, an audio peripheral for recording, playing, and analyzing audio signals, and a node controller for controlling operation of the node interface and the audio peripheral. The public switched network is configured to direct calls from a selected plurality of customer telephones to a first set of input ports on the node interface.

The method of the preferred embodiment of the present invention includes, with respect to a collect-call application for a penal environment, receiving an origination number and a destination number after a caller originates a long distance call from a customer telephone. The bridging node then generates input port identification data identifying the bridging node input port receiving the call and analyzing the input port identification data to select and initiate a customized, billing-controlled, collect-call bridging application.

Subsequently, the destination number and origination number are analyzed to configure the collect-call bridging application. Such analysis includes verifying that the owner of the destination number has not precluded requests for acceptance of collect-call charges. The origination number is also analyzed, subject to origination-number-specific installation options, to configure the collect-call bridging application to prompt the caller for a personal identification number (PIN) which is checked against lists of valid PIN's and used to compare the destination number to a list of destination numbers deemed permissible for a particular caller assigned to a particular PIN. Another configuration option includes giving a caller an opportunity to choose, for example, Spanish prompts. Furthermore, another configuration includes recording, or allowing real-time monitoring, of an inmate's conversation with a destination party.

Upon successful analysis of the destination and origination numbers, the caller is prompted by the bridging node for identification information which is recorded by the bridging node. If no response is received, the caller is prompted again and subsequently dropped by the bridging node if the caller remains silent. At no time is the caller connected to a live operator. Furthermore, the call is billing-controlled, thus the caller is never given an opportunity to select alternate forms of billing.

Upon receipt and recording of identification information, the destination number is called through a bridging node output port, and the destination party is prompted to accept collect-call charges with a prompt including the recorded identification information. The destination party's response is analyzed for an indication of acceptance, and the call is bridged upon acceptance of the charges. If no response is received from the destination party, the bridging node accesses and bridges a live operator to elicit a response from the destination party. The length of the call is monitored, and a call detail record is generated by the node controller.

An alternate embodiment of the present invention includes a plurality of bridging nodes distributed over a wide area, and the invention is capable of exploiting preexisting call forwarding schemes utilized by the public switched network to direct calls to an alternate bridging node. In another alternate embodiment of the present invention, a central controller is connected to the plurality of bridging nodes and provides diagnostic and node configuration alteration functions. In yet another alternate embodiment of the present invention, one central controller is used to replace all of the node controllers so that the central controller actively controls each and every bridging node.

It is therefore an object of the present invention to provide an automated telecommunication system which provides customized, billing-controlled call bridging services.

Another object of the present invention is to provide a call bridging system which is connected, through both inbound and outbound telephone lines, to one carrier switch of a public switched network.

Yet another object of the present invention is to provide a call bridging system designed to address billing fraud and nuisance calls.

Still another object of the present invention is to provide a call bridging system which analyzes input port identification data, origination numbers, and destination numbers to select customized call bridging applications.

Still another object of the present invention is to provide an automated method of bridging a collect-call which includes recording a caller's name and prompting a destination party for acceptance of the charges with a prompt which includes the caller's name.

Still another object of the present invention is to provide a call bridging system which records conversations and provides controlled access to the recorded conversations.

Still another object of the present invention is to provide a call bridging system which includes a plurality of bridging nodes connected through a public switched network which directs calls to secondary nodes upon unavailability of primary nodes.

Still another object of the present invention is to provide a call bridging system which provides voice messaging functions when call bridging is unsuccessful.

Other objects, features and advantages of the present invention will become apparent upon reading and understanding this specification, taken in conjunction with the accompanying drawings.

DETAILED DESCRIPTION OF THE PREFERRED EMBODIMENT

Figure 1:
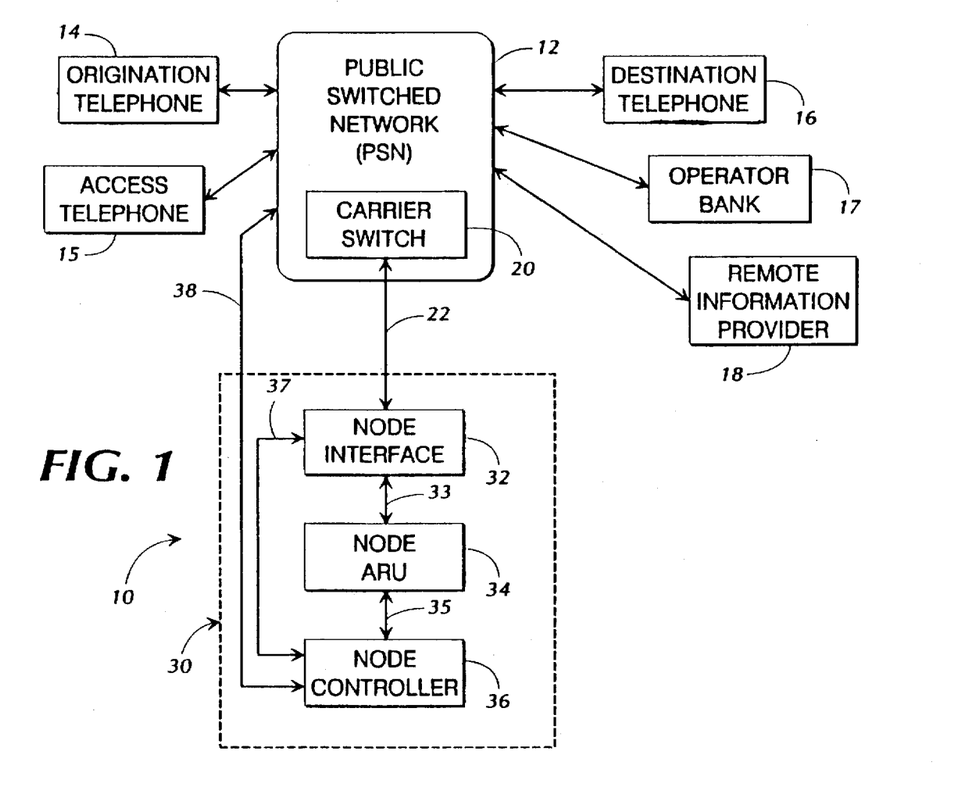
FIG. 1 is a block diagram representation of the physical domain of a Customized, Billing-Controlled Call Bridging System and associated components, in accordance with the preferred embodiment of the present invention.

Referring now in greater detail to the drawings, in which like numerals represent like components throughout the several views, FIG. 1 shows a block diagram representation of the physical domain of a Call Bridging System 10 and associated components, in accordance with the preferred embodiment of the present invention. The call bridging system 10 includes a bridging node 30 which includes a node interface 32, a node audio response unit (ARU) 34, and a node controller 36. The node interface 32 is connected through a network trunk group 22 to a carrier switch 20 of a public switched network (PSN) 12. The node ARU 34 is connected to the node interface 32 through an ARU trunk group 33 and to the node controller 36 through an ARU control line 35. The node controller 36 is connected to the node interface 32 through an interface control line 37 and to the PSN 12 through a controller access line 38.

An origination telephone 14, an access telephone 15, a destination telephone 16, an operator bank 17, and a remote information provider 18 are also shown connected to the PSN 12. Although shown as a single box, the origination telephone 14 represents a plurality of customer telephones serving one or more customers at one or more locations. Likewise, the access telephone 15 and destination telephone 16 represent pluralities of telephones. Operation of the elements 14–18 will be discussed in greater detail below.

It should also be understood that the PSN 12 includes a great variety of interconnecting switches, including local exchange carrier central offices (LEC CO's), access tandems, and long distance carrier points of presence (LDC POP's). Examples of acceptable connection links between the origination telephone 14 and the bridging node 30 include equal access lines traveling through LEC CO's, direct access lines, and 800-number lines accessed through automatic dialers.

The trunk groups 22, 33 each represent a plurality of incoming and outgoing trunks having pluralities of communication paths. One example of an acceptable trunk is the common T1 line. The ARU control line 35 and the interface control line 37 are data lines. One example of an acceptable data line for the ARU control line 35 and the interface control line 37 is the common RS-232 line. The controller access line 38 represents at least one ordinary telecommunication line which provides the node controller 36 access to the PSN 12 without going through the node interface 32. Futhermore, although only one node interface 32 and node ARU 34 are shown included in the bridging node 30, it is understood that additional components are added to increase capacity of the bridging node 30.

Figure 2:
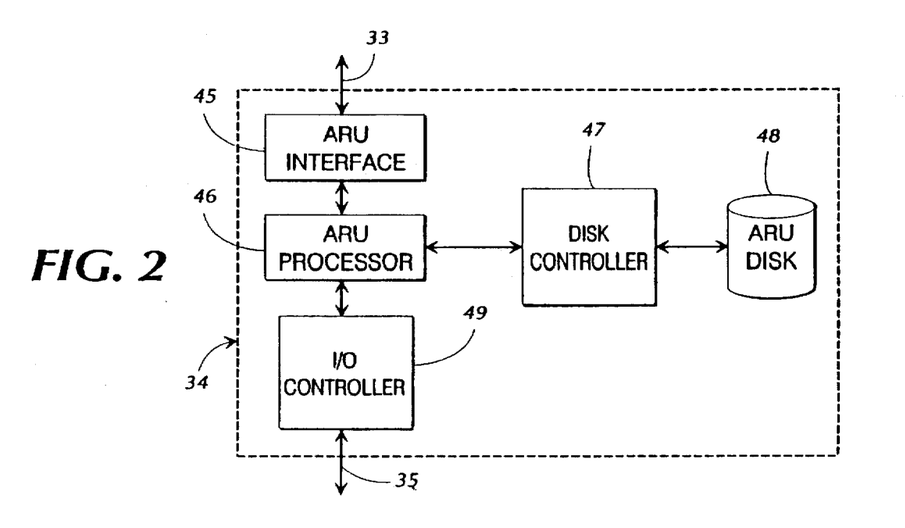
FIG. 2 is a block diagram representation of the node ARU of FIG. 1.

Refer also to FIG. 2, which shows the node ARU 34 of the preferred embodiment of the present invention in greater detail. References to components not appearing in particular Figures being described and not otherwise noted are understood to refer to FIG. 1. The node ARU 34 includes an ARU interface 45, an ARU processor 46, a disk controller 47, an ARU disk 48, and an I/O controller 49, connected as shown. The ARU 34 is an audio peripheral which, under the direction of the node controller 36, records, plays, and analyzes audio signals, as is explained in greater detail below. The ARU processor 46 controls the ARU interface 45, disk controller 47, and ARU disk 48 in response to commands received through the I/O controller 49 and ARU control line 35 from the node controller 36. The ARU interface 45 is capable of detecting and producing dual tone multi-frequency (DTMF) signals and converting audio signals between T1 and ARU disk 48 formats. One example of an acceptable node ARU 34 is the BTIII from Perception Technology Corp. of Canton, Mass.

Figure 3:
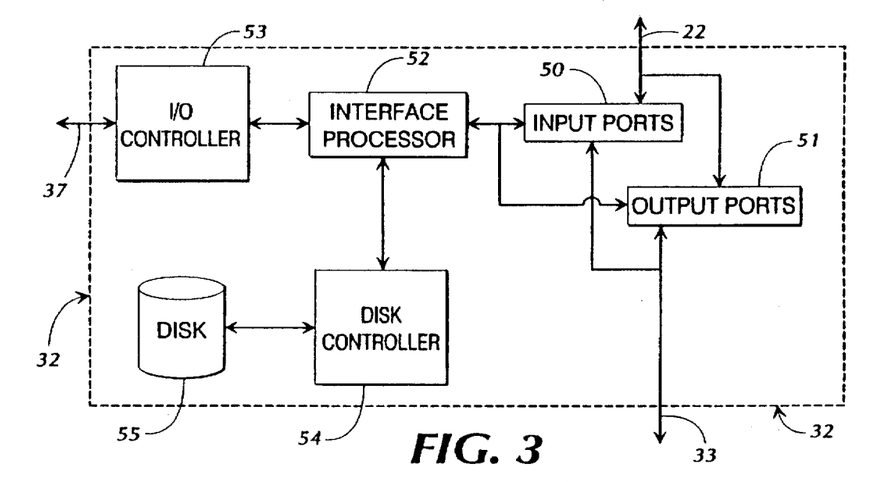
FIG. 3 is a block diagram representation of the node interface of FIG. 1.

FIG. 3 shows a block diagram representation of the node interface 32 of FIG. 1. The node interface 32 is shown including input ports 50, output ports 51, an interface processor 52, an I/O controller 53, a disk controller 54, and a disk 55, connected as shown. Regardless of the particular connection link between the origination telephone 14 and the node interface 32, the PSN 12 is configured to direct calls from the origination telephone 14, through the PSN 12 and network trunk group 22, and to specific input ports 50 on the node interface 32. Operation of the node interface 32 is controlled by both the interface processor 52 and the node controller 36, which sends commands through the interface control line 37 and the I/O controller 53. One example of an acceptable node interface 32 is the SDS-1000 from Summa Four of Manchester, N.H.

Figure 4:
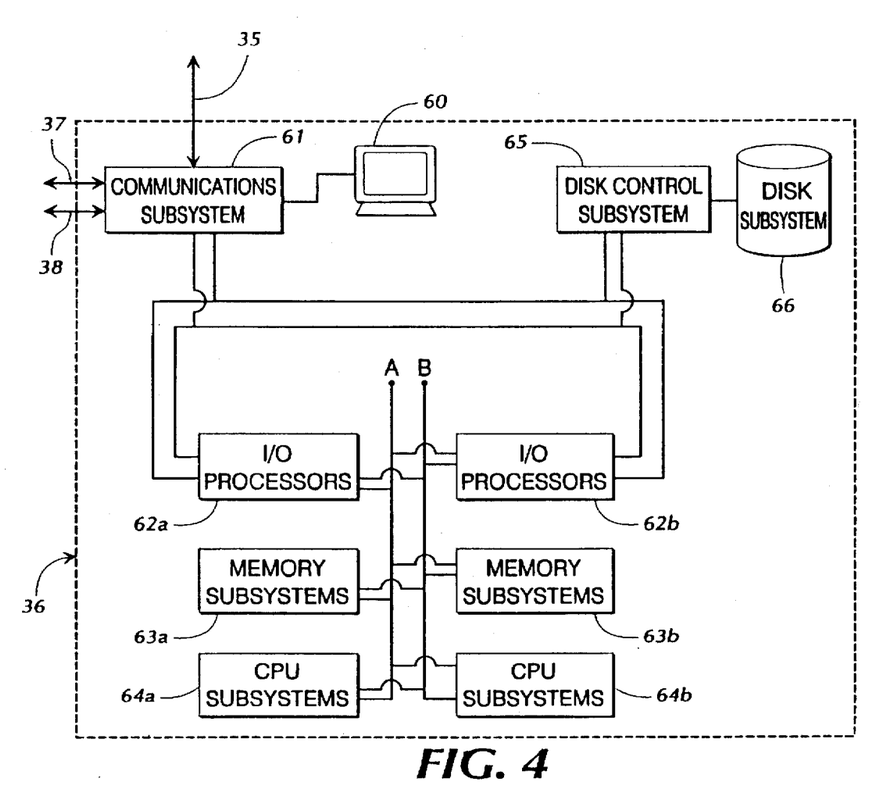
FIG. 4 is a block diagram representation of the node controller of FIG. 1.

Refer now to FIG. 4, which shows a block diagram representation of the node controller 36 of FIG. 1. Node controller 36 is a fault tolerant, general purpose controller which offers utility grade service from a redundant architecture which is capable of processing many applications simultaneously. Two buses, A & B, are both connected to redundant hardware components, including I/O processors 62a & 62b, memory subsystems 63a & 63b, and CPU subsystems 64a & 64b. I/O processors 62a & 62b are both connected to communications subsystem 61 and disk subsystem 66 through disk control subsystem 65. The ARU control line 35, interface control line 37, and control access line 38 are shown connected to communications subsystem 61. Terminal 60 is also shown connected to communications subsystem 61.

The redundant architecture of the node controller 36 ensures continuous application reliability and availability. If one component fails, its partner component typically continues so that there are normally two components performing the same function at the same time. Also, each CPU subsystem 64a, 64b contains duplicate CPU's which process the same data at the same time, thus a total of four processors typically work on the same data at the same time. Logic comparators continually compare the results of each processor. If the processors on a board disagree, that particular board is taken off line, an error signal is generated, and its partner component continues without any processing degradation.

The operation of each component of the node controller 36 is relatively straight forward. CPU subsystems 64 provide processor functions; memory subsystems 63 provide operating memory; and I/O processors 62 provide input and output capabilities. Disk control subsystem 65 provides control of disk subsystem 64, which stores conventional operating system programming and application programming. Terminal 60 provides human access to node controller 36 through communications subsystem 61. One example of an acceptable node controller 36 is the Stratus XA2000 model 30 from Stratus Computer, Inc. of Marlboro, Mass.

Figure 5:
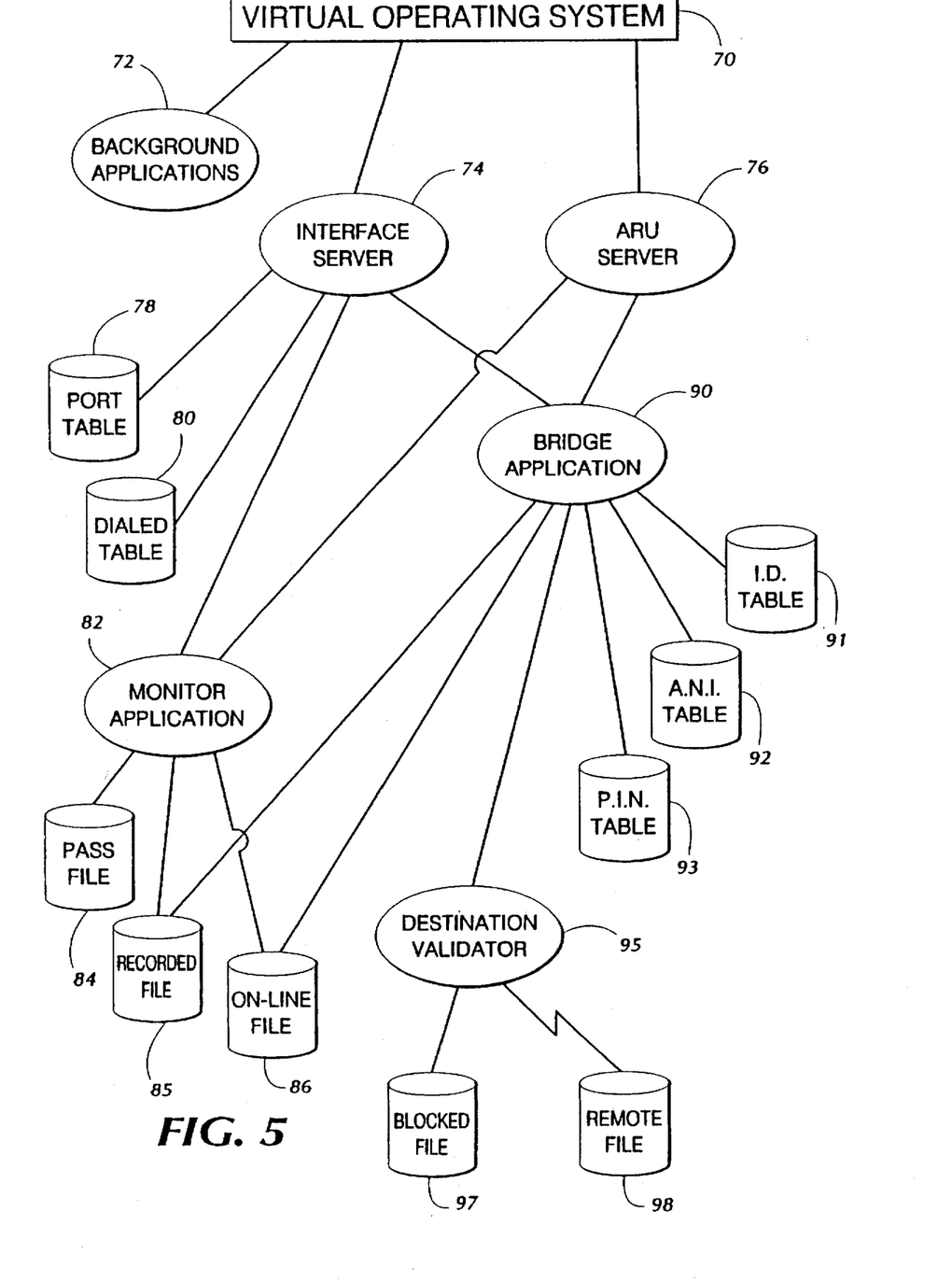
FIG. 5 is a block diagram representation of the program domain of the call bridging system of FIG. 1.

FIG. 5 is a block diagram representation of the program domain of the call bridging system 10 of the preferred embodiment of the present invention. In the preferred embodiment of the present invention, the programming domain represents programming found, in large part, on the node controller 36. Running below virtual operating system 70 are background applications 72, interface server 74, and ARU server 72. The interface server 74 accesses an input port table 78 and a dialed number table 80. Both the interface server 74 and the ARU server 76 are connected to a monitor application 82 and a bridge application 90. The connecting lines extending between the servers 74, 76 and applications 82, 90 represent interprocess communication paths. Although represented as single applications, the applications 82, 90 represent pluralities of customized applications running simultaneously on the node controller 36. The monitor application 82 is shown having access to a password file 84, a recorded file 85, and an on-line file 86. The bridge application 90 is also shown having access to the recorded file 85 and the on-line file 86. In addition, the bridge application 90 has access to an identification (ID) table 91, an automatic number identification (ANI) table 92, a personal identification number (PIN) table 93, and a destination validator 95, which is shown having access to a blocked file 97 and a remote file 98, located on the remote information provider 18 (FIG. 1).

Background applications 72 include applications which provide services which include, without limitation: billing, testing, error detection, and error notification. Billing services accumulate and format transaction records of each caller into appropriate billing formats for use locally or by remote billing agencies, accessed through the controller access line 38 (FIG. 1). Testing services routinely test various components throughout the system, including each communication path connected to the bridging node 30. The error detection and error notification services evaluate error signals received from various components and the testing services to identify the various types of errors. Based on that information, appropriate service personnel are notified of the error. Notification steps may include directing the node ARU 34 and node interface 32 to call and announce to selected service personnel appropriate error messages or accessing radio paging systems to notify the service personnel.

The interface server 74 and ARU server 76 are multitasking, multi-threading processes which provide programming interfaces between applications and the node interface 32 and node ARU 34, respectively. The node controller 36 utilizes servers and applications which reference files and tables during processing. Such a table-referencing method enhances customization, facilitates programming changes, and increases system availability.

FIGS. 6–9 are flow chart representations of steps taken by the call bridging system 10 of the preferred embodiment of the present invention when executing a billing-controlled, collect-call process, such as is suitable for many penal environments. Refer to previous Figures when references are made to components previously discussed.

Figure 6:
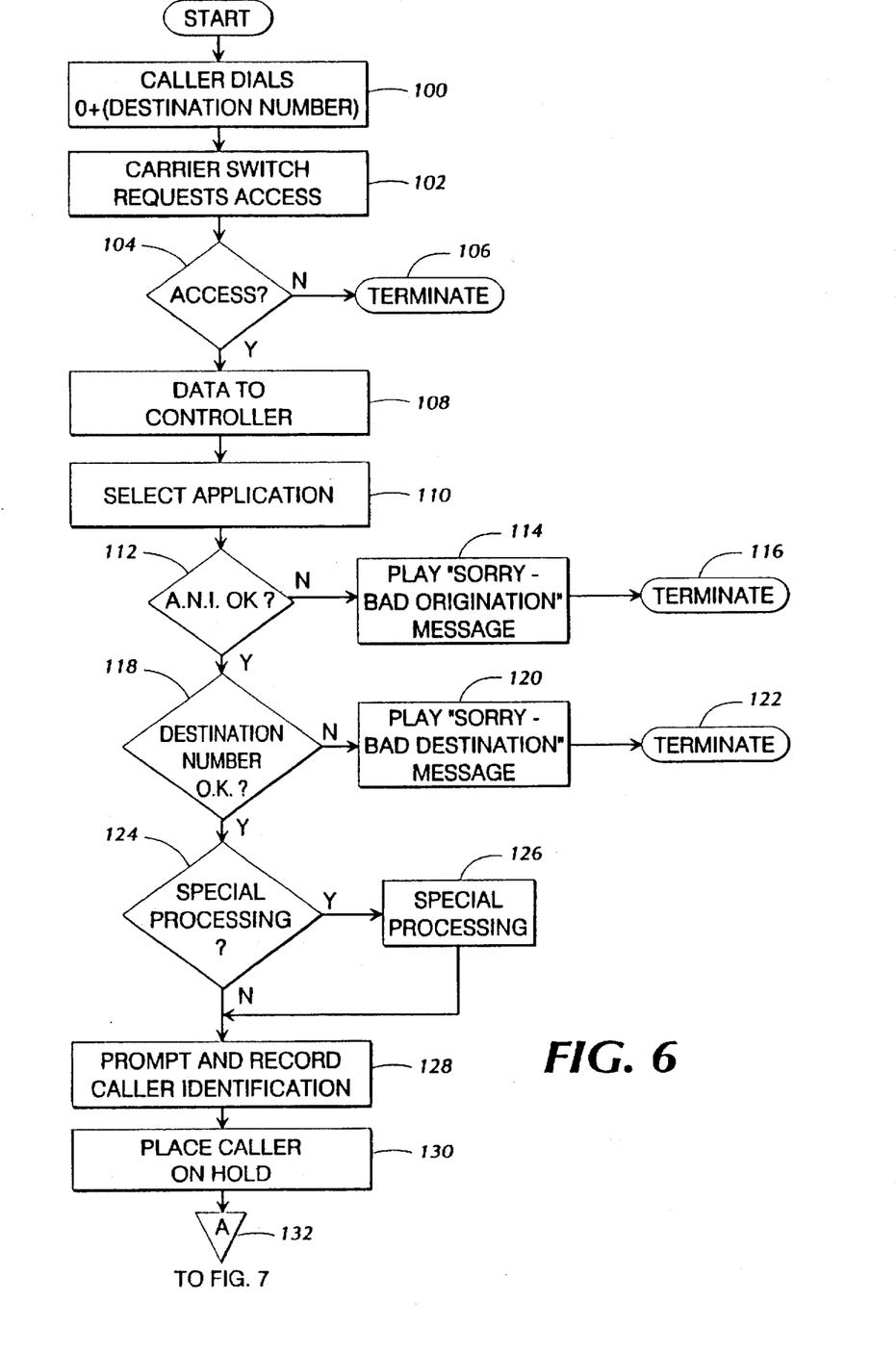
FIGS. 6–9 are flow chart representations of steps taken by the system of FIG. 1.

In FIG. 6, the collect-call bridging process is shown beginning in step 100 when a caller, such as an inmate, uses a selected customer telephone 14 to dial 0 +(destination number). The directory number assigned to the destination telephone 16 (and dialed by the caller) is referred to herein as the destination number, and the directory number assigned to the calling telephone (origination telephone 14) is referred to herein as the origination number. As configured, the PSN 12 routes the call to the carrier switch 20. The carrier switch 20 then requests access to the bridging node 30 (step 102) by signalling over the network trunk group 22 in a pre-defined format which is specific to a particular communication path leading into a particular input port 50. Several acceptable protocols include Feature Group D, direct access lines (or equivalent), and 800-number access through a dialer. The Feature Group D and dialer methods include supplying both the origination number and destination number, whereas the direct access method only supplies the destination number since the input port designation functions as an equivalent to the origination number for any direct access lines.

After the node interface 32 receives the request for access from the carrier switch 20, the node interface 32 analyzes the data of the request to determine if access should be granted (decision 104). In the preferred embodiment of the present invention, the interface processor 52 of the node interface 32 compares the data to configuration tables saved on the disk 55 to determine if access is granted. If access is not granted, the process is terminated (step 106), as is discussed in greater detail below. If access is granted, the call is answered and data is transferred from the node interface 32 to the node controller 36 along the interface control line 37 (step 108). The transferred data corresponds to the origination number, the destination number, and input port identification data generated by the node interface 32.

As the node controller 36 receives the transferred data, the program domain shown in FIG. 5 is accessed. The interface server 74 receives the transferred data and compares the interface identification data to the input port table 78 to select and initiate a customized application (step 110). If an input port 50 has been assigned to a particular application, such as a bridge application 90, the transferred data is then passed to the application through interprocess communication. However, if an input port 50 receives calls for many different applications, such as one or more monitor applications 82, the interface server 74 also references the dialed number table 80 to select a particular application and pass thereto the transferred data. A collect-call bridge application 90 is selected and initiated at step 110.

The first steps of the bridge application 90 are to analyze the origination number and destination number to further configure the bridge application 90 since, in addition to utilizing a plurality of customized bridge applications 90 in the preferred embodiment of the present invention, one particular bridge application 90 is often used to service a variety of different customers. According to the bridge application 90, the origination number (also referred to as the ANI) is first checked (step 112) against the ANI table 92 to verify that the PSN 12 and carrier switch 20 only direct calls from selected customer origination telephones 14. If the origination number is invalid, the bridging node 30 plays an announcement to the caller which indicates that the caller's telephone cannot access the bridging node 30. More specifically, the node controller 36, under direction of the bridge application 90, interface server 74, and ARU server 76, directs the node ARU 34 to play a particular digitized message on one of the communication paths on the ARU trunk group 33 and directs the node interface 32 to bridge that communication path with the communication path leading through the network trunk group 22 to the origination telephone 14 so that the caller hears the announcement. The process is then terminated at step 116.

If the ANI is valid, the destination number is checked (step 118) through the destination validator 95, which selectively accesses the blocked file 97 stored locally on the disk subsystem 66 (FIG. 4) and the remote file 98 stored remotely on the remote information provider 18 (FIG. 1). The destination number is checked to verify that the owner of the destination number has not precluded calls from particular origination telephones 14 (blocked file 97) or requests for acceptance of collect-call charges (remote file 98). If the destination number is not valid, an announcement is played to the caller indicating why the call cannot be completed, and the process is terminated (steps 120, 122).

If the destination number is valid, the bridge application 90 refers to the ID table 91 to determine, also based on the origination number, if special processing is required for this particular call, based on specific installation options (steps 124, 126). Optional special processing steps include prompting the caller for a personal identification number (PIN) and checking the caller's response against the PIN table 93, which can be used to further limit access to the bridge node 30 and to further restrict a caller's use by allowing specific callers access to a limited number of listed destinations. Another optional special processing routine includes giving a caller an opportunity to choose, for example, Spanish prompts. Yet another routine includes recording, or allowing real-time monitoring, of an inmate's conversation, as is discussed in greater detail below. In addition to performing special processing at the time indicated by step 126, special processing also refers to setting variables for optional processes which are delayed until later stages of the bridge application 90.

Step 128 refers to prompting the caller for identification information and recording the caller's response. More specifically, the node controller 36 instructs the node interface 32 to connect an ARU trunk group 33 communication path to the caller's communication path on the network trunk group 22 and instructs the node ARU 34 to play a prompt requesting the caller to speak his or her name and to record the caller's response. If no response is received, the caller is prompted again and subsequently dropped by the bridging node if the caller remains silent. Upon receiving and recording identification information, the caller is placed on hold (step 130).

Figure 7:
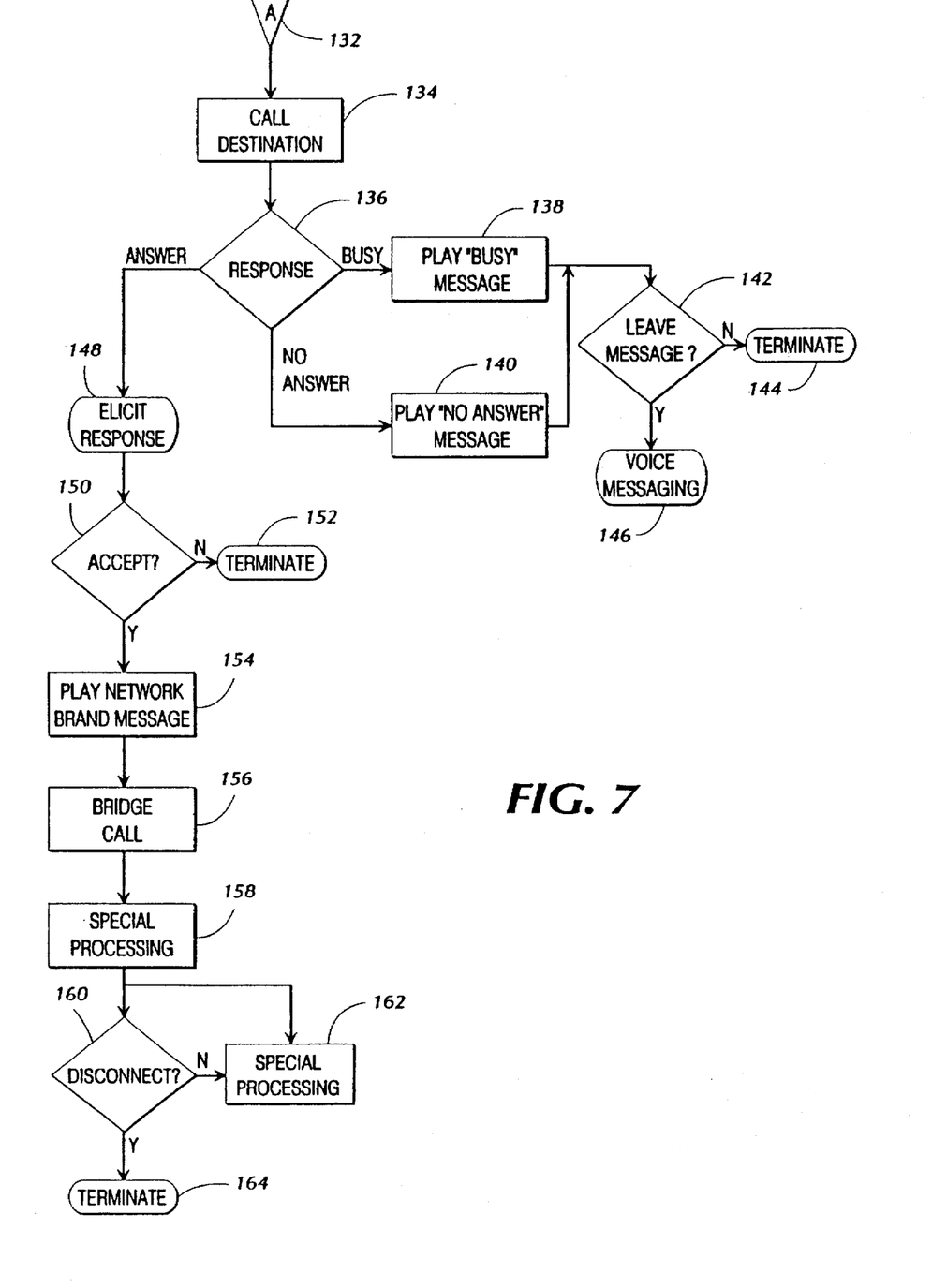

Referring now to FIG. 7, in the next step of the bridge application 90 (step 134), the bridging node 30 calls the destination number. The call is placed when the node controller 36 instructs the node ARN 34 to transmit the destination number through an output port of the node interface 32 and the network trunk group 22 to the carrier switch 20. Although protocal-specific data may accompany the destination number, the bridging node 30 does not transmit destination-specific routing instructions to the carrier switch 20 since the bridging node 30 does not utilize routing tables or files. The carrier switch 20, rather than the bridging node 30, then attempts to route the call to the destination telephone 16.

If there is no answer from the destination telephone 16, or if the destination telephone 16 is busy, (step 136) the bridge application 90 plays an appropriate "no answer" or "busy" message, respectively (steps 138, 140). The caller is then given the option of leaving a message for the destination party (steps 142–146). Voice messaging 146 includes recording a message from the caller and attempting to deliver the message to the destination party at at least one later point in time. Of course, the message would not be delivered unless the destination party accepts the charges for the collect call and the voice messaging service.

Figure 8:
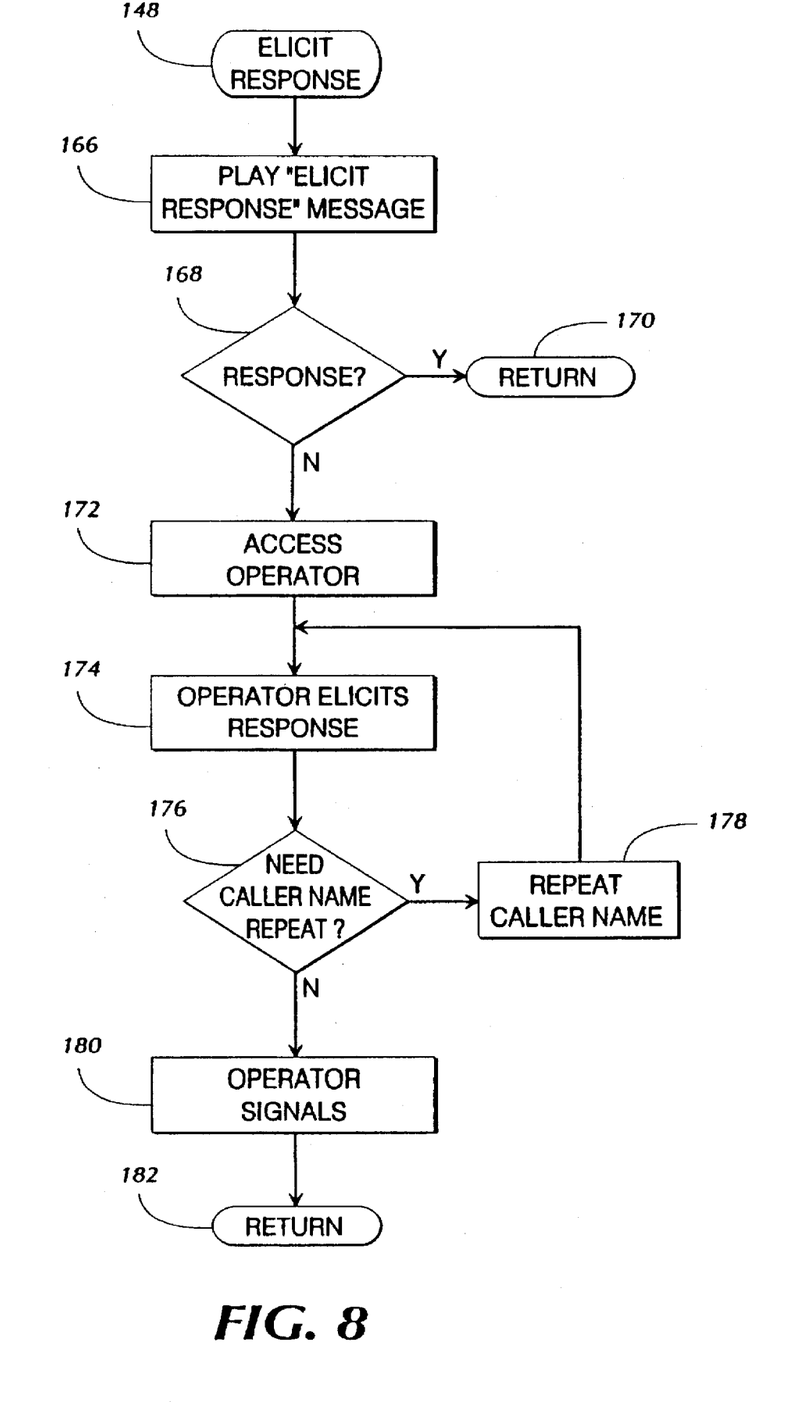

If the destination party answers the destination telephone 16, the bridge application elicits a response (step 148) from the destination party, as is shown in FIG. 8. An announcement is first played notifying the destination party that the caller is attempting to reach the destination party through collect billing and requesting the destination party to indicate, through transmitting a DTMF digit, whether or not the destination party will accept the charges. Such an announcement includes playing the digitized caller's name and any other origination-specific information, such as the penal institution's name. If the destination party responds to the announcement of step 166, the process continues in FIG. 7.

However, If the destination party does not respond, the bridging node 30 initiates a call to the operator bank 17 and bridges an operator onto the destination party's communication path through the node interface 32 (step 172). The operator manually elicits a response (step 174) from the destination party. If the destination party needs the caller's name repeated, (step 176, 178) the operator can signal the bridging node 30 to play the digitized caller's, name again. After receiving the destination party's response regarding acceptance of the collect-call charges, the operator signals an Indication (step 180) back to the bridging node 30. The process then continues in FIG. 7.

If the destination party chooses not to accept the charges, the processes is terminated (step 152). If the destination party chooses to accept the charges, the bridging node 30 plays a branding message thanking the parties for using the bridging node 30 (step 154). The call is then bridged through the node interface 32 (step 156). As the call is being bridged, origination-specific special processing variables for monitoring the conversation are checked (step 158). Such steps include accessing the on-line file 86 to determine if any penal administrators are holding to monitor the conversation, as is discussed in more detail below.

During the conversation, the bridge application 90 continually monitors the conversation to detect a disconnect in order to terminate the bridge (steps 160, 164). Also, additional origination-specific special processing is optionally performed (step 162). Such special processing includes limiting durations of calls or playing overlaying messages to the parties advising them of the caller's identity and location.

The process of terminating a call involves several steps. First, all communication paths are closed which may still be open on any inbound or outbound ports on the node interface 32 connected to either the network trunk group 22 or the ARU trunk group 33 which have been associated with this particular call. Then, a call detail record including the length of the call is created by the background application 72 and processed. Transmission of the billing records through the controller access line 38 to a billing service optionally occurs immediately after each call or on a batch basis. Finally, optional special processing occurs, such as saving a recorded conversation and updating the recorded file 85.

Figure 9:
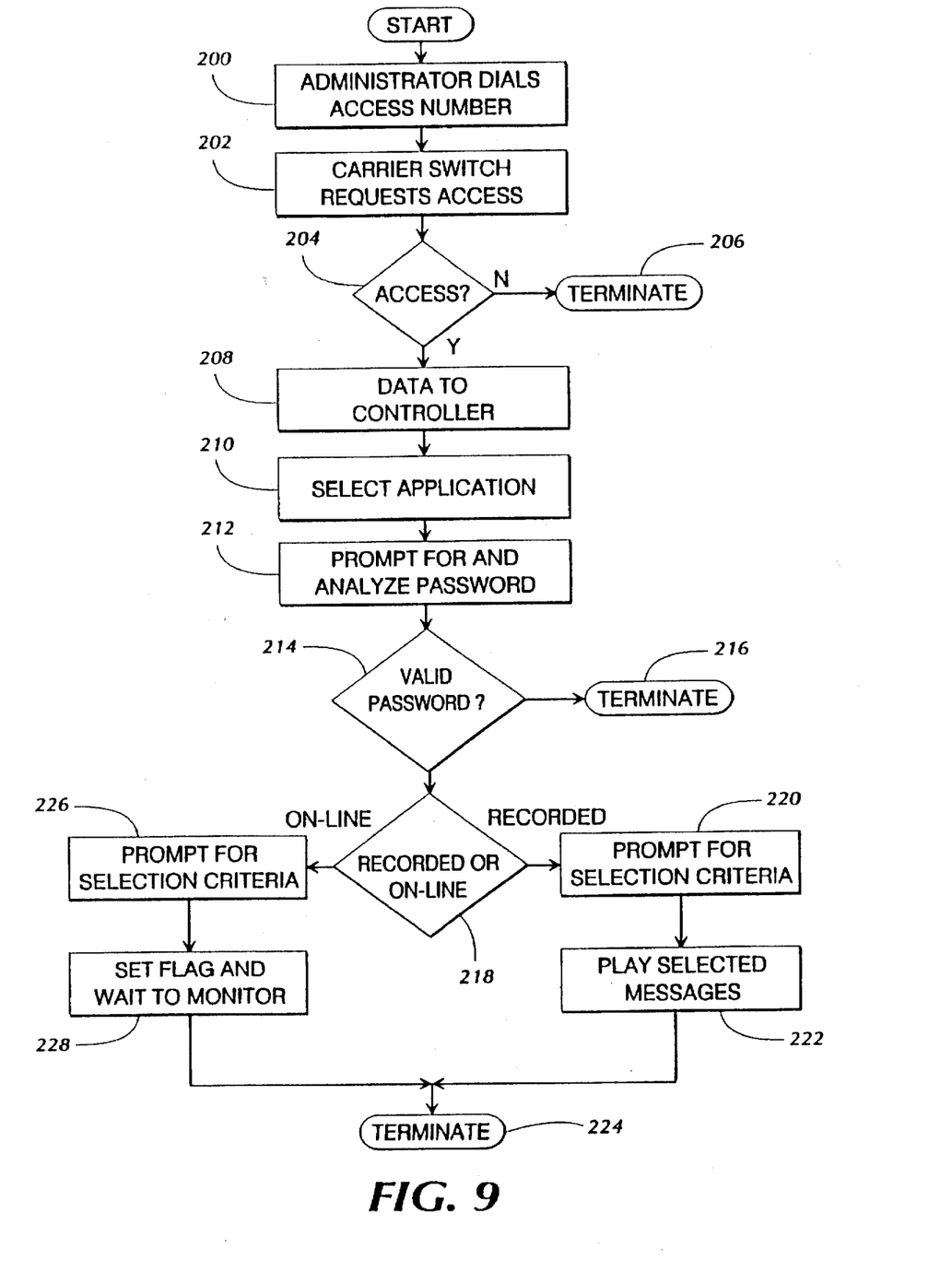

FIG. 9 shows a flow chart representation of the process of accessing the bridge node 30 to monitor caller conversations, including monitoring previously-recorded conversations and on-line, real-time conversations. In the penal environment example, a prison administrator dials a bridge node access number from an access telephone 15 (step 200). In steps very similar to those shown in FIG. 6, the carrier switch 20 requests access to the bridge node 30 (step 202). If access is granted by the node interface 32, (step 204) the origination number, dialed number (destination number), and input port identification data are transmitted to the node controller 36 (step 208). The interface server 74 then references the input port table 78 and dialed number table 80 to select and initiate a particular monitor application 82 (step 210).

The monitor application 82 then directs the ARU server 76 and interface server 74 to direct the node ARU 34 and node interface 32, respectively, to prompt the administrator for a password, record the administrator's response, and transmit the response back to the node controller 36 for analysis. The node controller 36 analyzes the password response and compares it to the password file 84 (step 212). If the password is not valid, the process is terminated (steps 214, 216). If the password is valid, the administrator is prompted to select on-line or recorded monitoring. (step 218)

If the administrator selects on-line monitoring, the administrator is prompted for selection criteria to determine which types of conversations are to be monitored (step 226). An administrator may choose to monitor all calls from one or more origination telephones 14, to one or more destination telephones 16, by one or more callers with identified by distinct PINs, or any combination thereof. After the administrator selects the criteria, a flag is set in the on-line file 86 which acts as a signal to all currently proceeding and future bridge applications 90 that an administrator desires to monitor certain types of conversations (step 228). If a match is ever found, the appropriate bridge application 90 will create a bridge to allow the administrator to listen to the conversation.

If the administrator selects recorded monitoring, the administrator is again prompted for selection criteria (step 220). The monitor application 82 then accesses the recorded file 85 to determine if any recorded conversations match the selection criteria. If matches are found, the monitor application directs the node ARU 34 to play the conversations to the administrator (step 222). After monitoring is completed, the application is terminated (step 224).

In an alternate embodiment of the present invention, a plurality of bridging nodes 30 are distributed over a wide area, and the public switched network is configured to direct calls to an alternate bridging node 30 upon unavailability of a primary bridging node 30. In another alternate embodiment of the present invention, a central controller, similar to the node controller 36, is connected through a wide-area network to the plurality of bridging nodes 30 and provides diagnostic and node configuration alteration functions. In yet another alternate embodiment of the present invention, one central controller is used to replace all of the node controllers 36 so that the central controller actively controls each and every bridging node over the wide area network.

While the embodiments of the present invention which have been disclosed herein are the preferred forms, other embodiments of the apparatuses and methods of the present invention will suggest themselves to persons skilled in the art in view of this disclosure. Therefore, it will be understood that variations and modifications can be effected within the spirit and scope of the invention and that the scope of the present invention should only be limited by the claims below.

I claim:

1. A method of bridging a call between an origination telephone having an origination number and a destination telephone having a destination number, said method comprising the steps of:

connecting a self-controlled bridging node located outside of a public switched network to a telecommunications switch located within the public switched network, wherein the self-controlled bridging node includes, at least, a node interface having a plurality of ports connected to a plurality of trunks from the telecommunications switch and an audio response unit connected to the node interface, the audio response unit storing a plurality of messages;

receiving on a first communication path at the node interface from the telecommunications switch a call bridging request including, at least, a destination number assigned to a destination telephone located remotely from the bridging node, as a result of a caller dialing the destination number to initiate a telephone call from an origination telephone located remotely from the bridging node and to which origination telephone is assigned the origination number;

answering the telephone call on the first communication path at a first port of the plurality of ports;

supplying the destination number to the telecommunications switch, including a step of generating a plurality of signals representative of the destination number at the audio response unit and a step of transmitting the plurality of signals through a second communication path from a second port of the plurality of ports to the telecommunications switch; and bridging together the first communication path and the second communication path at the node interface to provide a connection between the origination telephone and the destination telephone.

2. The method of claim 1 wherein, the method further includes, at least, the steps of providing a plurality of call bridging services at the bridging node, identifying at least one port of the plurality of ports in a port table, and assigning a call bridging service of the plurality of call bridging services to the port identified in the port table.

3. The method of claim 2 wherein, the method further includes, at least, the steps of receiving the call bridging request at the first port, generating port identification data at the node interface representative of the first port, and comparing the port identification data to each port identified in the port table to select and initiate a call bridging service from the plurality of call bridging services upon determining that the port identification data corresponds to a port identified in the port table.

4. The method of claim 3 wherein, the method further includes, at least, a step of transferring the origination and destination numbers to the selected call bridging service.

5. The method of claim 1 wherein, the method further includes, at least, the steps of providing a plurality of call bridging services at the bridging node, identifying the plurality of ports in a port table, and assigning at least one call bridging service to a port of the plurality of ports identified in the port table.

6. The method of claim 5 wherein, the method further includes, at least, the steps of receiving the call bridging request at the first port, generating port identification data at the node interface representative of the first port, comparing the port identification data to each port identified in the port table to detect a port corresponding to the first port, upon detecting a port corresponding to the first port, determining whether or not more than one call bridging service is assigned to the first port, and upon determining that more than one call bridging service is assigned to the first port, comparing the destination number to a dialed number table at the bridging node to select and initiate a call bridging service from the call bridging services assigned to the first port.

7. The method of claim 1 wherein, the receiving step includes, at least, receiving the origination number at the node interface through the first communication path from the telecommunications switch, and the method further includes, at least, a step of comparing the origination number to an origination number table to determine whether or not to grant access to the bridging node.

8. The method of claim 7 wherein, upon denying access to the bridging node, the method further includes, the steps of identifying a message from the plurality of messages at the audio response unit, playing the identified message at the audio response unit on a third communication path, and bridging the third communication path to the origination telephone.

9. The method of claim 7 wherein, upon allowing access to the bridging node, the method further includes, at least, a step of checking the destination number to determine whether or not the destination telephone is precluded from receiving the call from the origination telephone.

10. The method of claim 9 wherein, upon determining that the destination telephone is precluded from receiving the call from the origination telephone, the method further includes, the steps of identifying a message from the plurality of messages at the audio response unit, playing the identified message at the audio response unit on a third communication path, and bridging the third communication path to the origination telephone.

11. The method of claim 7 wherein, upon allowing access to the bridging node and determining that the call is a collect call, the method further includes, at least, a step of checking the destination number to determine whether or not a request for acceptance of collect call charges is required before completion of the call to the destination telephone.

12. The method of claim 11 wherein, upon determining that a request for acceptance of collect call charges is required, the method further includes, at least, the steps of identifying a message from the plurality of messages at the audio response unit, wherein the message includes, at least, a statement notifying a destination party at the destination telephone that the call is a collect call and requesting a response from the destination party to accept or reject receipt of the call, playing the identified message at the audio response unit on a third communication path, and bridging the third communication path to the destination telephone.

13. The method of claim 12, wherein the method further includes, at least, the steps of receiving a name for the caller through the first communication path, digitizing the name at the audio response unit, and playing the digitized caller's name at the audio response unit on the second communication path.

14. The method of claim 12 wherein, upon determining that the origination telephone is located at a site having potential importance to a destination party, the method further includes, at least, the steps of identifying a message from the plurality of messages at the audio response unit, wherein the message identifies that the caller is calling from a site of potential importance to a destination party, playing the identified message at the audio response unit on a third communication path, and bridging the third communication path to the destination telephone.

15. The method of claim 12 wherein, upon failing to receive a response from the destination party, the method further includes, at least, the steps of initiating a call from the bridging node on the third communication path to an operator located at a live operator bank, and bridging the third communication path to the second communication path at the node interface, whereby communication is enabled between the operator and the destination party.

16. The method of claim 1 wherein, the method further includes, at least, a step of limiting the duration of the call.

17. The method of claim 1 wherein, the method further includes, at least, the steps of identifying a message from the plurality of messages at the audio response unit, wherein the message includes, at least, the caller's identity and a location of the origination telephone, playing the identified message at the audio response unit on a third communication path, and bridging the third communication path to the destination telephone while a conversation is ongoing between the origination and destination telephones.

18. The method of claim 1 wherein,
the self-controlled bridging node is one of a plurality of self-controlled bridging nodes, each self-controlled bridging node of the plurality of self-controlled bridging nodes being located at a different location outside the public switched network and being connected to a telecommunication switch within the public switched network, and
the method further includes, at least, the steps of:
identifying the self-controlled bridging node as a primary bridging node,
identifing another self-controlled bridging node of the plurality of self-controlled bridging nodes as a secondary bridging node,
attempting to receive the call at the primary bridging node, and
upon unavailability of the primary bridging node, receiving the call at the secondary bridging node.

19. A call bridging apparatus for bridging a call, said apparatus comprising:
an interface connected outside of a public switched network and through a telecommunications switch within said public switched network to an origination telephone having an origination number and to a destination telephone having a destination number, said interface including, at least, a plurality of communication ports connected to said telecommunications switch;
an audio response means connected to said interface for storing and playing audio signals; and
a control means for controlling said call bridging apparatus, said control means including, at least,
a receiving means for directing said interface to accept a call through a first communication port of said plurality of communication ports from a caller dialing said destination number from an origination telephone,
a calling means for directing said interface and said audio response means to call a destination telephone through a second communication port of said plurality of communication ports,
a connecting means for connecting said first communication port to said second communication port thereby connecting an origination telephone to a destination telephone, and
a monitoring means for directing said interface to accept at a third communication port of said plurality of communication ports a monitoring call from a monitoring telephone as a result of an administrator dialing a number associated with said monitoring means, for directing said audio response means to transmit audio signals to said monitor telephone instructing said administrator to supply a criterion representative of a type of conversation to be selected for monitoring, and for directing said receiving means to receive a response from said monitor telephone, and for determining whether or not to monitor conversation between said origination telephone and said destination telephone based upon said response received from said monitor telephone.

20. The apparatus of claim 19, wherein said criterion includes, at least, an origination number assigned to an origination telephone.

21. The apparatus of claim 19, wherein said criterion includes, at least, a destination number assigned to a destination telephone.

22. The apparatus of claim 19, wherein said criterion includes, at least, a personal identification number assigned to a caller.

23. The apparatus of claim 19 wherein,
said control means further includes, at least, means for directing said audio response means to transmit audio signals to said monitor telephone prompting said administrator for a password,
said receiving means includes, at least, means for receiving a response at said call bridging apparatus from said administrator, and
said control means further includes, at least, means for comparing said response from said administrator to a list of passwords at said call bridging apparatus to control access to said monitoring means.

24. The apparatus of claim 19 wherein,
said monitoring means further includes, at least, means for directing said audio response means to transmit audio signals to said monitor telephone requesting selection of a monitoring method from one of (i) on-line monitoring and (ii) recorded monitoring, and
said receiving means includes, at least, means for receiving at said third communication port a monitoring method selection from said monitor telephone.

25. The apparatus of claim 19 wherein, said monitoring means further includes, at least,
recording means for recording conversation between an origination telephone and a destination telephone after said first communication port is connected to said second communication port, and
storage means for storing at said call bridging apparatus a conversation recorded by said recording means.

26. The apparatus of claim 25 wherein,
said monitoring means further includes, at least, means for directing said audio response means to transmit audio signals to said monitor telephone requesting selection of a monitoring method from one of (i) on-line monitoring and (ii) recorded monitoring, and
said receiving means includes, at least, means for receiving at said third communication port a monitoring method selection from said monitor telephone.

27. The apparatus of claim 26, wherein said monitoring means further includes, at least,
means for accessing said storage means, after said receiving means receives a monitoring method selection corresponding to recorded monitoring, and for determining whether or not a conversation stored by said storage means matches said criterion received from said administrator, and
means for directing said audio response means to play back to said monitor telephone through said third communication port a conversation stored by said storage means which conversation matches said criteria.

28. The apparatus of claim 24, further comprising:
means associated with said connecting means for connecting said third communication port to said first and second communication ports thereby connecting said monitor telephone to an origination telephone and a destination telephone; and means associated with said monitoring means for determining, after said receiving means receives a monitoring method selection corresponding to on-line monitoring, whether or not a conversation conducted between said origination telephone and said destination telephone matches said criterion received from said administrator, which criterion is representative of the type of conversation to be selected for monitoring, and means for connecting said third communication port to said first and second communication ports after finding a match, whereby an administrator at the monitor telephone can listen to the conversation conducted between the origination telephone and the destination telephone.

* * * * *